(12) United States Patent
Witmer (10) Patent No.: US 9,301,099 B2
(45) Date of Patent: Mar. 29, 2016

(54) METHOD OF ANALYZING POINTS OF INTEREST WITH PROBE DATA

(71) Applicant: TomTom North America, Inc., Lebanon, NH (US)

(72) Inventor: James Alan Witmer, Lebanon, NH (US)

(73) Assignee: TomTom North America, Inc., Lebanon, NH (US)

(*) Notice: Subject to any disclaimer, the term of this patent is extended or adjusted under 35 U.S.C. 154(b) by 0 days.

(21) Appl. No.: 14/474,395

(22) Filed: Sep. 2, 2014

(65) Prior Publication Data

US 2014/0372022 A1    Dec. 18, 2014

Related U.S. Application Data

(63) Continuation-in-part of application No. 13/504,491, filed as application No. PCT/US2009/069949 on Dec. 31, 2009, now abandoned.

(60) Provisional application No. 61/279,981, filed on Oct. 29, 2009.

(51) Int. Cl.

| G01C 21/00 | (2006.01) |
|---|---|
| G01C 21/32 | (2006.01) |
| H04W 4/00 | (2009.01) |
| H04W 4/02 | (2009.01) |
| G01C 21/36 | (2006.01) |

(Continued)

(52) U.S. Cl.
CPC .............. *H04W 4/027* (2013.01); *G01C 21/32* (2013.01); *G01C 21/3679* (2013.01); *G06F 17/30241* (2013.01); *H04W 4/021* (2013.01); *H04W 4/046* (2013.01)

(58) Field of Classification Search
USPC ......................................... 701/400, 423, 119
See application file for complete search history.

(56) References Cited

U.S. PATENT DOCUMENTS

| 6,430,411 B1 | 8/2002 | Lempio et al. |
|---|---|---|
| 6,529,143 B2 | 3/2003 | Mikkola et al. |

(Continued)

FOREIGN PATENT DOCUMENTS

| CN | 101258532 A | 9/2008 |
|---|---|---|
| JP | 2009169527 A | 7/2009 |
| WO | 2009059766 A1 | 5/2009 |

OTHER PUBLICATIONS

International Search Report issued Mar. 5, 2010 for International Application No. PCT/US2009/069949.

*Primary Examiner* — Yonel Beaulieu (57) ABSTRACT

A method of analyzing points of interest (22) using traces from probe data is provided. The method includes providing a database of a digital vector map (18) configured to store a plurality of traces (1'-14') representing roads. The method further includes collecting probe data from vehicles traveling along the traces. Then, bundling a group of select traces (2', 5', 7', 9', 11') having routes with a common origin (20) and at least one divergence point (24, I) downstream from the origin (20) and building a database of vehicle maneuvers over the routes. Further, computing average speeds and delay times of a random population of vehicles traversing the vehicle maneuvers. Further yet, computing average speeds and delay times of all vehicles traversing the routes. Then, comparing the computed results from the random population of vehicles with the computed results from all vehicles traversing said routes.

20 Claims, 9 Drawing Sheets (51) Int. Cl.
   *G06F 17/30*   (2006.01)
   *H04W 4/04*   (2009.01)

(56) References Cited

U.S. PATENT DOCUMENTS 7,433,889 B1   10/2008   Barton
   7,499,949 B2    3/2009   Barton
   2002/0016667 A1   2/2002   Baur et al.
   2004/0030670 A1   2/2004   Barton
   2009/0100031 A1*  4/2009   Gilligan et al. .................. 707/4
   2009/0138497 A1   5/2009   Zavoli et al.
   2009/0157566 A1   6/2009   Grush
   2014/0173520 A1*  6/2014   Sheha et al. ................... 715/834
   2014/0289267 A1*  9/2014   Felix et al. ..................... 707/758
   2015/0127239 A1*  5/2015   Breed et al. .................... 701/70

* cited by examiner

METHOD OF ANALYZING POINTS OF INTEREST WITH PROBE DATA

CROSS-REFERENCE TO RELATED APPLICATIONS

The present application is a continuation-in-part of U.S. patent application Ser. No. 13/504,491 filed on Jun. 27, 2012, now abandoned, which is the National Stage of International Application No. PCT/US2009/69949 filed on Dec. 31, 2009, and designating the United States, which claims the benefit of U.S. Provisional Patent Application No. 61/279,981 filed Oct. 29, 2009. The entire content of all these applications is incorporated herein by reference.

FIELD OF THE INVENTION

This invention relates generally to methods for analyzing points of interest, and more particularly to methods of analyzing points of interest with Global Positioning System (GPS)-enabled devices.

BACKGROUND

A transportation network is any navigable system of roads, pedestrian walkways, paths, rivers, shipping lanes or other network that is utilized to transport humans or vehicles. A transportation network can also include combinations of routes for the above modes of transportation. These combinations of routes are referred to as multimodal transportation networks.

A transportation network can be modelled and stored as a digital representation in a digital map database. In so doing, the transportation network is usually represented as a plurality of navigable segments (or "links") connected at nodes, with attributes being associated with the links and/or nodes. Nodes are therefore connectors between the links, and generally occur at intersections where there is a decision point with respect to travel from one navigable segment to another. Conventionally, in the context of a transportation network, the attributes limit how travel can flow on the network. For example, attribution may include: geometry, speed of travel, whether or not a turn at an intersection is allowed (i.e. allowable "maneuvers"), at least one direction of traffic flow, number of lanes, etc.

Typically, such digital maps of transportation networks are created by traversing all paths/elements of the transportation network with highly specialized location measuring and recording systems designed for this purpose. Transportation network information can also be gleaned from aerial images or compiled from existing localized digital transportation networks. It is also becoming more common to create, or at least update and/or refine, a digital map utilizing positional information representative of the movements of one or more, although typically a plurality of, location-aware mobile devices over the transportation network over time.

Such positional information is commonly referred to as "probe data" (or "probe traces"). Each trace indicates a geographic position of each mobile device against time, i.e. traces the path of the device. A location-aware mobile device, herein referred to simply as a mobile device, is any device capable of determining its geographic location from wirelessly received signals. The received signals may include signals received from satellites of a global navigation satellite system (GNSS), such as GPS signals. The mobile device may be a navigation device such as a portable navigation device (PND), in-vehicle navigation device, mobile phone, portable computing device, vehicle tracking device, and the like. The mobile devices may therefore be associated with a vehicle, but it is also envisaged that the mobile devices could be associated with pedestrians. The navigation device is arranged to record a trace of a path or route followed by the navigation device. The navigation device may store the trace in a local memory of the navigation device or may communicate the trace to a server computer, such as via a wireless data connection with the server computer. The trace may be formed from data indicative of a series of geographic locations at which the navigation device is located at periodic intervals. However in other embodiments the trace may be formed by data representing one or more curves indicative of the path of the navigation device.

Methods of creating, updating and/or refining digital maps using probe data may utilize probe traces as received from the mobile devices (often referred to as "uncoordinated" traces), refined probe traces (i.e. uncoordinated probe traces that have been subjected to one or more of the following: smoothing; adjusting the position of at least portions of the trace depending on the direction of traffic flow, filtering traces not associated with a type of the transportation network), one or more bundles each comprising a plurality of traces, or any combination thereof. Bundles of probe traces are formed from a plurality of individual probe traces, uncoordinated or refined, which traverse a path having the same beginning and at least one common divergence point within a spatial threshold value and which do not deviate, in location, by more than a threshold from a reference probe trace (e.g. a probe trace passing through a densely populated area of probe traces). In other words, a probe trace bundle is a single probe trace that represents a plurality of individual probe traces; and may be used beneficially in the creation, updating and/or refinement of a digital map.

Additional transportation network information, such as points of interest (POIs) are often analyzed via tabular information, for example, as via manual research; via directories of restaurants in a chain with their addresses; points supplied by customers, third parties, address lists, and the like, wherein the points of interest are assigned a coordinate (latitude/longitude) and/or geocoded. Unfortunately, the results can be fraught with errors, such as due to human error. Further, rating of the POIs is typically manual, and thus, generally proves, difficult and costly. In addition, the manual data gathered can become dated in a relatively short period of time, thereby rendering the data obsolete and increasingly inaccurate.

SUMMARY

In accordance with one aspect of the invention, a method of analyzing points of interest using traces from probe data is provided. The method includes providing a database of a digital vector map configured to store a plurality of traces representing roads and collecting probe data from vehicles traveling along the traces. Then, bundling a group of select traces having routes with a common origin and at least one divergence point downstream from the origin and building a database of vehicle maneuvers over the routes. Further, computing average speeds and delay times of a random population of vehicles traversing the vehicle maneuvers. Further yet, computing average speeds and delay times of all vehicles traversing the routes. Then, comparing the computed results from the random population of vehicles with the computed results from all vehicles traversing said routes.

Upon comparing the computed results from the random population of vehicles with the computed results of all vehicles traversing the selected routes, statistically probable differences are able to be discerned. Accordingly, POIs are able to be identified by noting the differences in vehicle behavior over the selected routes.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

In the following description, illustrative embodiments will be described with reference to acts and symbolic representations of operations (e.g. in the form of flowcharts) that may be implemented as program modules or functional processes include routines, programs, objects, components, data structures, that perform particular tasks or implement particular abstract data types and may be implemented using existing hardware at existing network elements or control nodes (e.g. a database). Such existing hardware may include one or more Central Processing Units (CPUs), digital signal processors (DSPs), application-specific-integrated-circuits, field programmable gate arrays (FPGAs) computers or the like.

Note also that the software implemented aspects of example embodiments are typically encoded on some form of computer readable medium or implemented over some type of transmission medium. The computer readable medium may be magnetic (e.g. a floppy disk or a hard drive) or optical (e.g. a compact disk read only memory, or "CD ROM"), and may be read only or random access. Similarly, the transmission medium may be twisted wire pairs, coaxial cable, optical fiber, or some other suitable transmission medium known to the art. Example embodiments are not limited by these aspects of any given implementation.

Example embodiments of the present disclosure may be described with particular reference to a navigation device (ND) or personal navigation device (PND). It should be remembered, however, that the teachings of the present disclosure are not limited to NDs or PNDs, but are instead universally applicable to any type of processing device that is configured to execute navigation software so as to provide route planning and navigation functionality. It follows, therefore, that in the context of the present application, a navigation device is intended to include (without limitation) any type of route planning and navigation device, irrespective of whether that device is embodied as a PND, a navigation device built into a vehicle, or a computing resource (such as a desktop or portable personal computer (PC), mobile telephone or portable digital assistant (PDA)) executing route planning and navigation software. In addition to street/road networks, example embodiments may be implemented in pedestrian navigation networks and/or any other type of transportation network or combinations of transportation networks (referred to as multimodal transportation networks).

While example embodiments described herein utilize GPS measurements (probe trace points) including latitude and longitude coordinates as location measurements, it should be understood that location measurements may be obtained from any source and are not limited to GPS. For example, other Global Navigation Satellite Systems (GNSS), such as GLONAS, Galileo, etc., or non-GNSS systems, such as inertial indoor systems, computer vision, etc., may be used. Further, while location measurements described herein operate in two spatial dimensions, the discussed example embodiments may be implemented in three or more dimensions.

In accordance with one aspect described herein, information is obtained from global behavior of vehicles traveling along a navigable street network, wherein the street network is defined by a plurality of traces. The information is useful to assess specific behavior of the vehicles, and thus, can be used to determine where particular points of interest (POIs) exist along the navigable street network. The POI can be pre-existing, or new. The information gathered can be obtained substantially real-time, and thus, the information is current and reliable. Further, since the navigable street network undergoes dynamic change, the changes that occur can be monitored and processed in an economical manner, without need for manual data gathering. The information can be used to determine the decision patterns of travelers, whether they be utilizing motorized vehicles, bicycles, pedestrian travel, or otherwise. Accordingly, embodiments are not limited to assessing the behavior of motorized vehicles.

Figure 1:
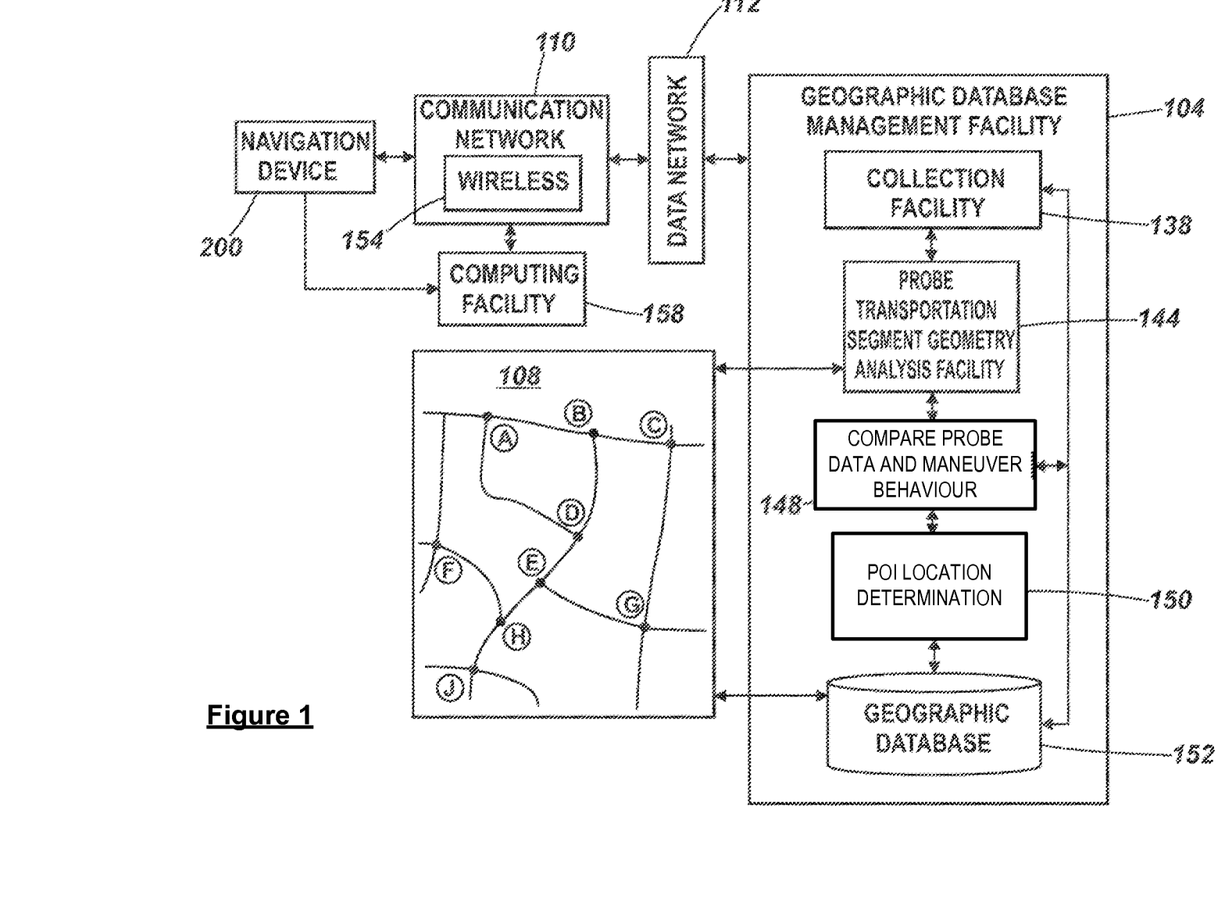
FIG. 1 is a block diagram detailing various component parts of a map database system according to an example embodiment.

FIG. 1 is a block diagram detailing various component parts of a map database system. Referring to FIG. 1, a navigation device (ND) 200 communicates with a geographic database management facility 104 through a communication network 110 and data network 112. The communication network 110 may be a wireless communications network 154 through a service provider (e.g. through a cellular network); a wireless communications network 154 through an area network (e.g. through a Wi-Fi hot spot or WiMAX); a wired connection to a computing facility 158 (e.g. as provided to a home personal computer); or the like.

Still referring to FIG. 1, the geographic database management facility 104 includes a collection facility 138. The collection facility 138 collects road characteristic and/or probe data from a plurality of navigation devices 200, or other non-navigation probe devices (e.g. truck monitoring systems for collection of probe data). As discussed above, probe data may include sequential location measurements such as probe trace points. Probe trace points identify coordinates on the surface of the Earth, which are usually expressed in latitude, longitude and, possibly, altitude (e.g. in meters above sea level). The time at which these measurements were recorded may also be stored. From a sequential set of these measurements, heading, velocity and slope can be derived. Location measurements may be acquired periodically (e.g. every 5 seconds) by the navigation device 200.

Still referring to FIG. 1, acquired probe data is provided to a probe transportation segment geometry analysis facility 144. At the probe transportation segment geometry analysis facility 144, transportation network segment geometry and attributes (e.g., POIs) are inferred from the collected probe data. A geometry and attribute compare unit 148 compares the inferred probe geometry and attributes with maneuver behavior information acquired from the collected probe data, which may be bundled probe data, to detect and interpret differences. The geometry and attribute compare unit 148 generates inferred POI locations 150. Ultimately, the inferred POI locations 150 may be provided to the geographic database 152 and on to users as a part of an update to a local geographic database of, for example, navigation device 200.

Figure 2:
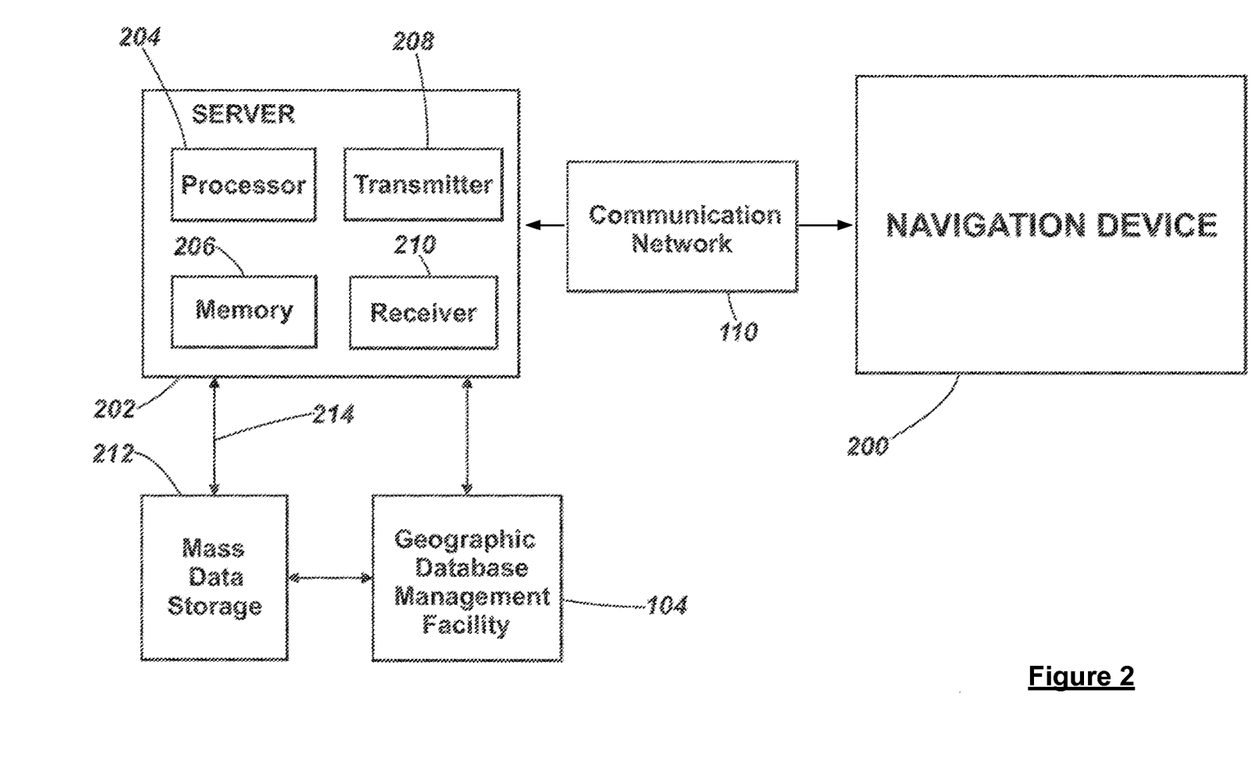
FIG. 2 is a schematic illustration of the manner in which a navigation device may receive or transmit information over a wireless communication channel.

FIG. 2 is a schematic illustration of an example manner in which a navigation device transmits or receives information over a wireless communication channel. Referring to FIG. 2, the navigation device 200 may establish a "mobile" or telecommunications network connection with a server 202 via a mobile device (e.g. a mobile phone, PDA, and/or any device with mobile phone technology), which is not shown. In so doing, the navigation device 200 may establish a digital connection (e.g. a digital connection via known Bluetooth technology) with the mobile device. Thereafter, the mobile device can establish a network connection (through the Internet for example) with the server 202 through a network service provider. Through the "mobile" network connection, the navigation device 200 and the server 202 may exchange "real-time" or at least very "up to date" information via communication network 110.

The establishing of the network connection between the mobile device (via a service provider) and another device such as the server 202, using the Internet, for example, may be done in a known manner. This may include use of TCP/IP layered protocol for example. The mobile device may utilize any number of communication standards, for example CDMA, GSM, WAN, GPRS (General Packet Radio Service), GSRM, etc.

The navigation device 200 may include mobile phone technology within the navigation device 200 itself (including an antenna or optionally using the internal antenna of the navigation device 200). The mobile phone technology within the navigation device 200 may include internal components as specified above, and/or may include an insertable card (e.g. Subscriber Identity Module (SIM) card), complete with necessary mobile phone technology and/or an antenna for example. As such, mobile phone technology within the navigation device 200 may similarly establish a network connection between the navigation device 200 and the server 202, via the Internet for example, in a manner similar to that of any mobile device.

In FIG. 2 the navigation device 200 is depicted as being in communication with the server 202 via a generic communication network 110 that may be implemented by any of a number of known arrangements. The server 202 includes a receiver 210 configured to receive sequential location measurements (e.g. probe trace points) from the navigation device 200. The server 202 further includes a processor 204 configured to, inter alia, process received probe data to create and/or update a stored digital map. The processor 204 is operatively connected to a transmitter 208, the receiver 210 and a memory 206. The transmitter 208 and the receiver 210 transmit/receive information to/from the navigation device 200 via the communication network 110. The signals sent and received may include, for example, data, communication, and/or other propagated signals. Although described separately, the functions of the transmitter 208 and the receiver 210 may be combined into a signal transceiver. The processor 204 is also operatively connected to a mass data storage device 212 via a wired or wireless connection 214. The mass storage device 212 may contain a store of navigation data and map information, and may be a separate device from the server 202. Alternatively, the mass data storage device 212 may be incorporated into the server 202. The server 202 is further connected to (or includes) the geographic database management facility 104 described above with regard to FIG. 1.

The navigation device 200 may be adapted to communicate with the server 202 through the communication network 110, and may include at least a processor and a memory as described in more detail below with regard to FIG. 3.

Software stored in the memory 206 may provide instructions for the processor 204 and may allow the server 202 to provide services to the navigation device 200. One service provided by the server 202 may involve, for example, processing requests from the navigation device 200 and transmitting navigation data from the mass data storage 212 to the navigation device 200. Another service provided by the server 202 may include, for example, processing the navigation data using various algorithms for a desired application and sending the results of these calculations to the navigation device 200.

The server 202 may include a remote server accessible by the navigation device 200 via a wireless channel. The server 202 may include a network server located on, for example, a local area network (LAN), wide area network (WAN) and/or virtual private network (VPN). More specifically, for example, the server 202 may include a personal computer such as a desktop or a laptop computer. The communication network 110 may be a cable connected between the personal computer and the navigation device 200. Alternatively, a personal computer may be connected between the navigation device 200 and the server 202 to establish an Internet connection between the server 202 and the navigation device 200. Alternatively, a mobile telephone or other handheld device may establish a wireless connection to the internet, for connecting the navigation device 200 to the server 202 via the internet.

The navigation device 200 may be provided with information from the server 202 via information downloads, which may be periodically updated automatically or upon a user connecting navigation device 200 to the server 202 and/or may be more dynamic upon a more constant or frequent connection between the server 202 and navigation device 200 via a wireless mobile connection device and TCP/IP connection, for example. For many dynamic calculations, the processor 204 may handle the bulk of the processing needs. However, the processor 510 of navigation device 200 (shown in FIG. 3) may also handle processing and calculation, often times independent of a connection to server 202.

The navigation device 200 may also provide information to server 202. For example, navigation device 200 may include hardware and/or software (described in more detail below with regard to FIG. 3) configured to provide probe data to the geographic database management facility 104 via, for example, communication network 110 and server 202.

Figure 3:
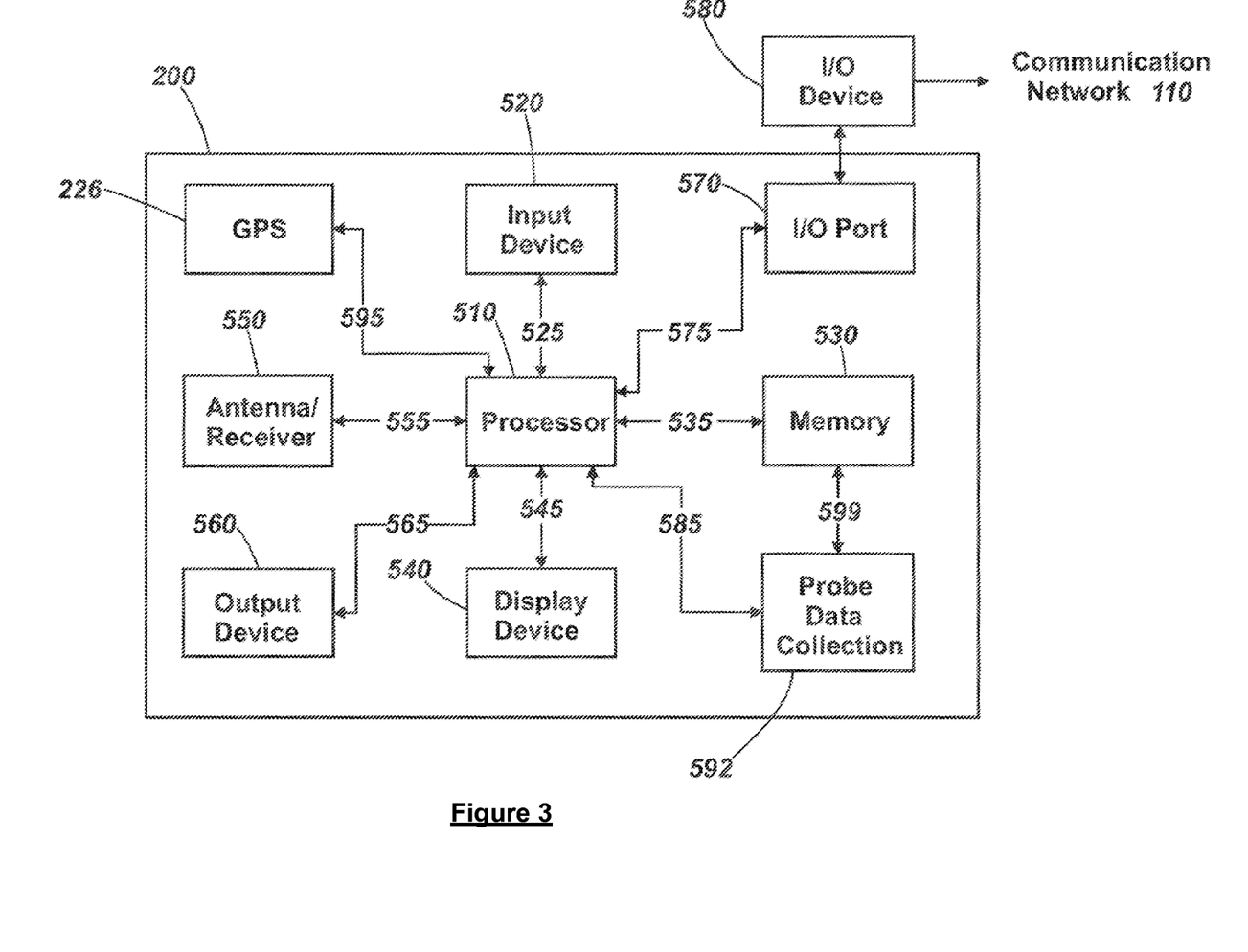
FIG. 3 is a schematic illustration of a navigation device according to an example embodiment.

FIG. 3 is a block diagram illustrating a navigation device according to an example embodiment in more detail. It should be noted that the block diagram of the navigation device 200 is not inclusive of all components of the navigation device, but is only representative of some example components. The navigation device 200 includes a processor 510 connected to an input device 520 and a display screen 540. The input device 520 can include a keyboard device, voice input device, touch panel and/or any other known input device for inputting information. The display screen 540 can include any type of display screen such as an LCD display, for example. In an example arrangement, the input device 520 and display screen 540 are integrated into an integrated input and display device, including a touchpad or touch screen input so that a user need only touch a portion of the display screen 540 to select one of a plurality of display choices or to activate one of a plurality of virtual buttons. The navigation device may include an output device 560, for example an audible output device (e.g. a loudspeaker). Input device 520 can include a microphone and software for receiving input voice commands.

Still referring to FIG. 3, the processor 510 is operatively connected to and configured to receive information from the input device 520 via a connection 525. The processor 510 is also operatively connected to at least one of display screen 540 and output device 560, via output connections 545 and 565, respectively. Further, the processor 510 is operably coupled to a memory resource 530 via connection 535 and is further adapted to receive/send information from/to input/output (I/O) ports 570 via connection 575. The I/O port 570 may be connected to an I/O device 580 external to the navigation device 200.

The memory 530 may include, for example, a volatile memory (e.g. Random Access Memory (RAM)) and a non-volatile memory (e.g. a digital memory, such as a flash memory). The external I/O device 580 may include an external listening device such as an earpiece or the like. The connection to I/O device 580 can further be a wired or wireless connection to any other external device such as a car stereo unit for hands-free operation and/or for voice activated operation for example, for connection to an ear piece or head phones, and/or for connection to a mobile phone.

FIG. 3 further illustrates an operative connection between the processor 510 and an antenna/receiver 550 via connection 555. In one example, the antenna/receiver 550 may be a GPS antenna/receiver. The antenna and receiver designated by reference numeral 550 are combined schematically for illustration. But, the antenna and receiver may be separate components. The antenna may be a GPS patch antenna or helical antenna for example.

The navigation device 200 may use embedded GPS receiver 226 to determine current data (e.g., position, speed, heading, slope, etc.) associated with the navigation device 200. GPS receiver 226 is connected to processor 510 via connection 595. This data, in combination with a local geographic database (e.g., stored in memory 530), may be used to provide a user of the navigation device 200 with information associated with their current travel conditions. This information may include, for example: location in relation to a stored map in the local geographic database; estimated time of arrival given a destination; location of proximate points of interest and information thereof. The probe data collection facility 592 may collect said information from the navigation device 200 and local geographic database over a period of time, and either store the information for later transmission, or transmit the information real-time through the navigation device's 200 communication system, for example, via I/O device 580 and communication network 110. The probe data collection facility 592 is connected to the processor 510 via connection 585. The probe data collection facility 592 is also connected to the memory 530 via connection 599.

Figure 4:
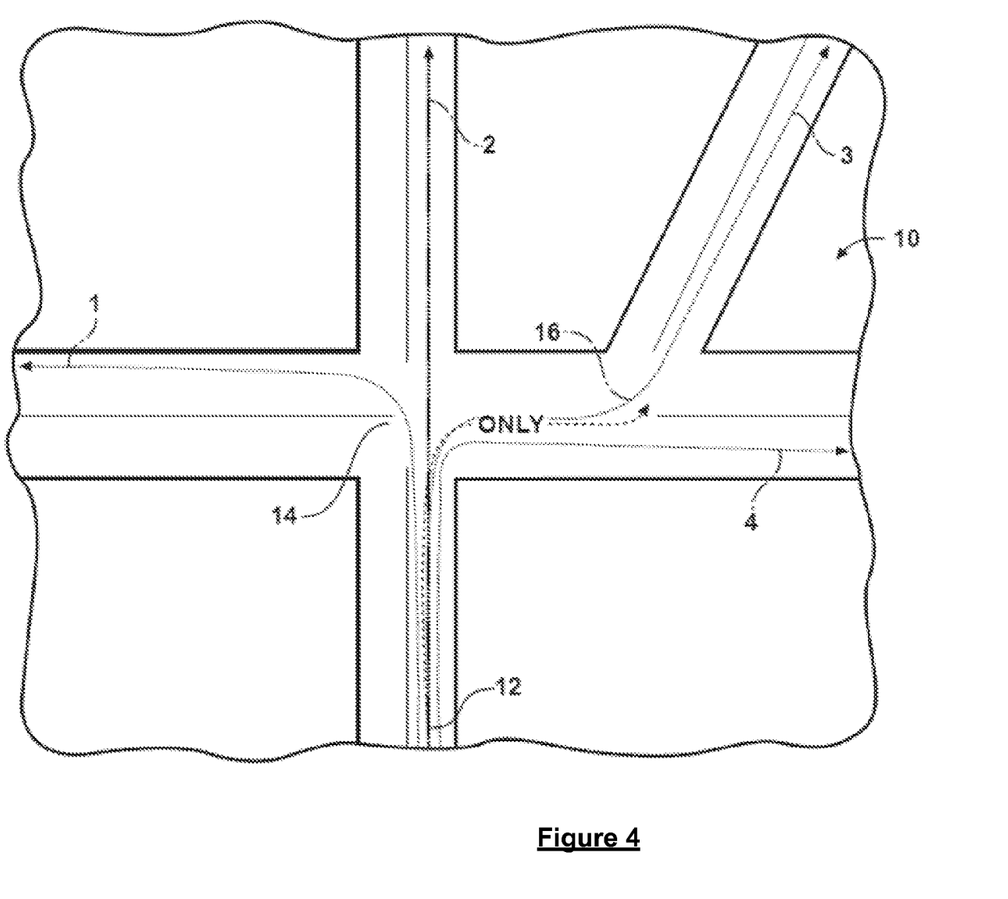
FIG. 4 illustrates a selected bundle of traces to be analyzed from a navigable street network database.
Figure 5A:
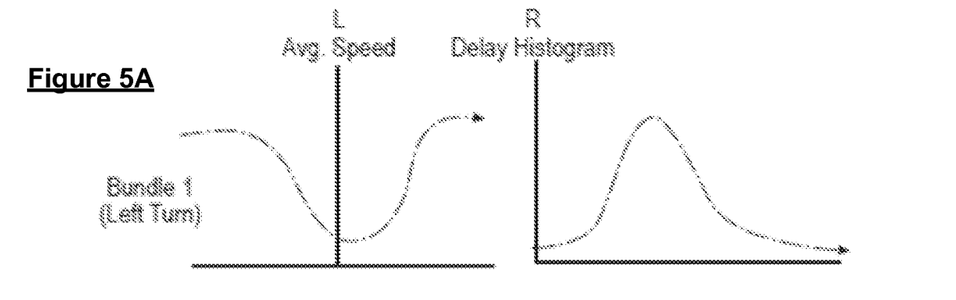
FIGS. 5A-5D illustrate examples of average speeds and delay times of vehicles over a select portion of the bundles of traces of FIG. 4.
Figure 5B:
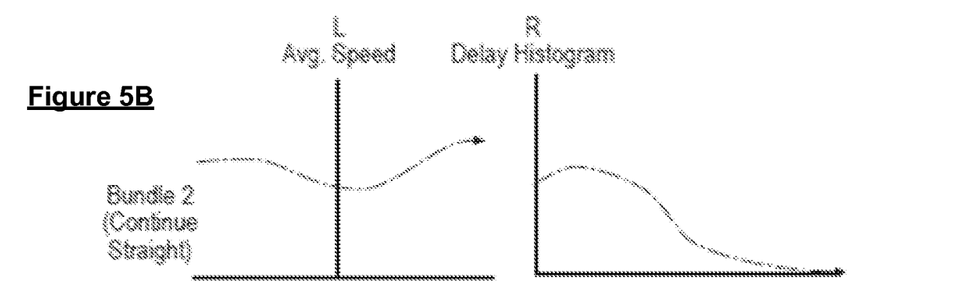
Figure 5C:
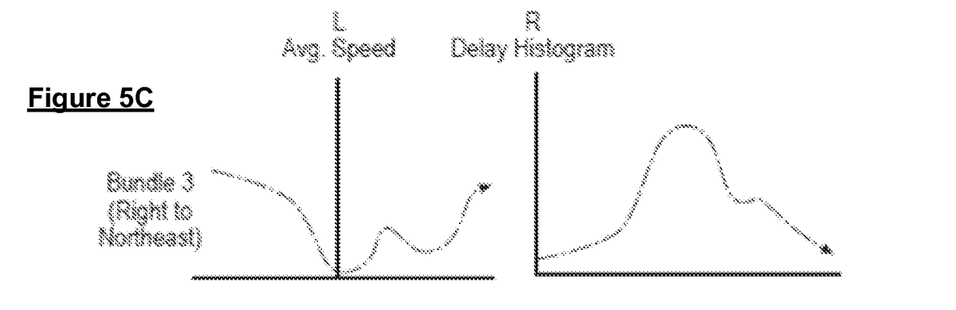
Figure 5D:
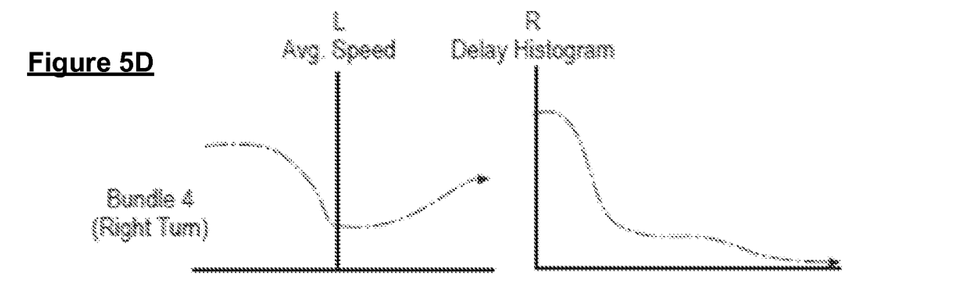

Referring in more detail to the drawings, FIG. 4 illustrates an example of how a database of traces can be bundled and selected for analysis from a portion of a navigable street network 10, by way of example and without limitation. The bundled traces exemplified have been assigned end points enumerated 1-4. Each of the traces originates from a common location or origin 12 and pass through a common intersection 14. As can be seen some of the traces share travel paths over a portion of their distance, such as exhibited by trace bundles 3 and 4 until they reach a divergence point 16. Accordingly, when gathering date for vehicles traveling along trace bundles 3 and 4, it is important that the data collected from vehicles traveling along these bundles be obtained far enough along there respective paths to detect the decisions made by the vehicles upon reaching the divergence point 16 in the bundles 3 and 4. In addition, upon reaching the divergence point 16, as can be imagined, vehicles wishing to travel along trace bundle 3 may be delayed at the divergence point 16 for any number of reasons. For example, some vehicles may have to wait for a line of vehicles prior to turning, or they may have to wait for an indicator signal.

In order to assess the travel behavior of the mobile devices traveling along the bundled traces 1-4, the maneuvers of the vehicles and/or other forms of movement associated with mobile devices (i.e., cycling, pedestrian or other) traveling along the bundled traces 1-4 can be analyzed. As shown in FIGS. 5A-5D, wherein FIG. 5A corresponds to bundled trace 1, FIG. 5B corresponds to bundled trace 2, FIG. 5C corresponds to bundled trace 3, and FIG. 5D corresponds to bundled trace 4, an average speed profile of the vehicles (column L) and an average delay time profile of the vehicles (column R) over the bundled traces 1-4 can be obtained via probe date received from the vehicles. Any suitable statistical program application can be used to generate the averaged information. As can be seen, the information obtained for vehicles traveling along trace 1 indicates that the vehicles turning left come to a stop or near stop and then resume a speed immediately thereafter approximating the speed prior to making the turn. In contrast, the vehicles traveling along trace 2 behave differently than those traveling along trace 1, wherein the vehicles traveling along trace 2 slow slightly from their top end speed while traveling through the intersection 14 and then resume immediately thereafter their top end speed. In further contrast, the vehicles traveling along trace 3 exhibit the slowest average speed at the intersection 14 to make a right hand turn, then speed up slightly, followed by another decline in average speed to make a left hand turn at the divergence point 16. Then, for the vehicles traveling along trace 4, the behavior at the intersection 14 is markedly different from those desiring to travel along trace 3, wherein although the vehicles traveling along trace 4 slow their average speed to make a right hand turn at the intersection, the decline in average speed is not nearly as great as those traveling to trace 3. Accordingly, it is important to be able to distinguish between the vehicles traveling along the traces 3 and 4 in order to obtain meaningful conclusions regarding their behavior. With the database of maneuvers over the traces 1-4 now constructed, probe date obtained from vehicles traveling the different traces 1-4 can be used to assess POIs attracting the vehicles and likewise, POIs can be populated or verified on the traces 1-4 to bring them to the attention to the users of Global Positioning System (GPS)-enabled personal navigation devices, such as those manufactured by TomTom NV (www.tomtom.com). However, any suitable device with GPS functionality may be used, including handheld devices, Personal Digital Assistants (PDAs), mobile phones, and the like.

Figure 6:
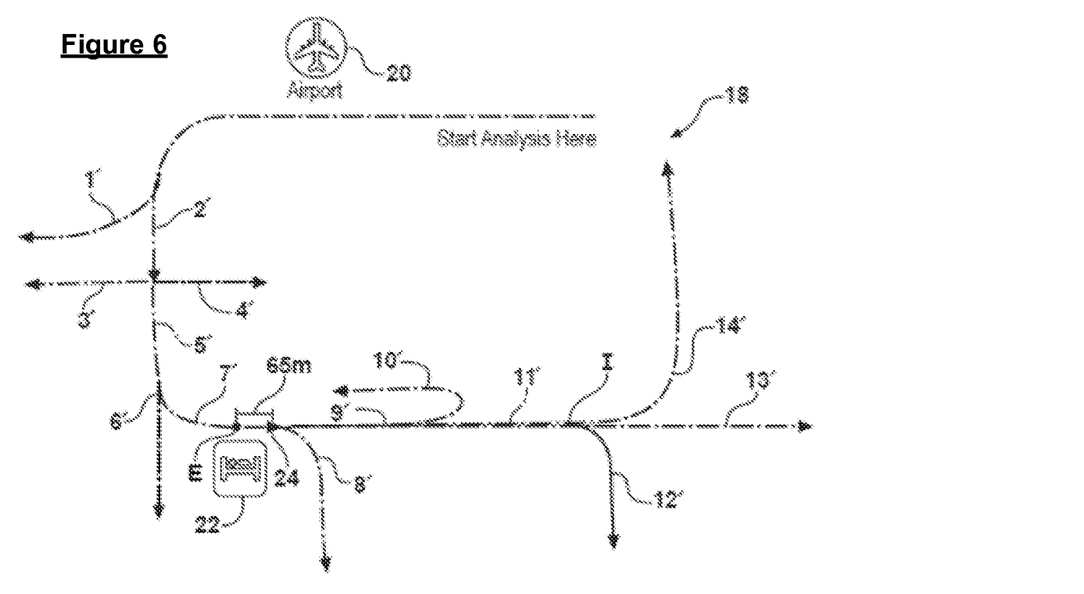
FIG. 6 illustrates another selected bundle of traces to be analyzed.

In an example of how a database of maneuvers over a selected group of traces on a navigable street network 18 can be utilized, we now refer to FIG. 6, which depicts a database of bundled traces 1'-14' exiting a common location, wherein the location is represented as an airport 20, by way of example and without limitation. It should be recognized that, for discussion purposes, the illustration is simplified, and that the bundled traces can be as complex as necessary to encompass the area desired for study. Each trace path 1'-14' is associated with the sequence of maneuvers that it follows upon exiting the airport 20. The sequence of maneuvers can be continued until the trace ends; until the trace returns to the airport 20, such as often occurs with taxis or buses; until the trace extends beyond a predetermined geographical limit, or until the trace exhibits a marked decrease in travel by vehicles, for example. Of course, other constraints can be used to determine the traces and how far to extend analysis thereof.

In our example, we note that starting with the exit of the airport 20, in which traces 1' and 2' are the only possible decisions for vehicles to travel. Upon study, we learn from probe data received that the vast majority of vehicles leaving the airport 20 continue along trace 2', and that only slight minority travel along trace 1'. So, for purposes of assessing POIs for vehicles leaving the airport 20, we discount those vehicles electing to travel trace 1', and continue monitoring probe data from those vehicles traveling along trace 2'. We continue this line of reasoning until there is no one favored trace of travel over another, and by doing so, we learn from probe data that the most favored traces traveled by vehicles are 2', 5', 7', 9' and 11', and that upon reaching the intersection (I) at 12', 13' and 14', there is no clear favored trace traveled by vehicles exiting the airport 20. And so, for our specific purpose of vehicle behavior study, we elect to study the selected series of maneuvers (referred to as "route") of the vehicles traveling the probe traces 2', 5', 7', 9', 11' (referred to as "group") through the maneuver ending at trace 11'.

In order to determine POIs located along the group 2', 5', 7', 9', 11' of study, and in our example, a POI being represented as a hotel 22, an algorithm is used to compare the behavior in maneuvers (speed through the maneuver, stop time at decision point) between an overall random population of vehicles and vehicles leaving airport 20, referred to as the airport group. If the behavior between the two populations of vehicles diverges such that it is statistically probable that they are different, then a POI can be determined.

Figure 7A:
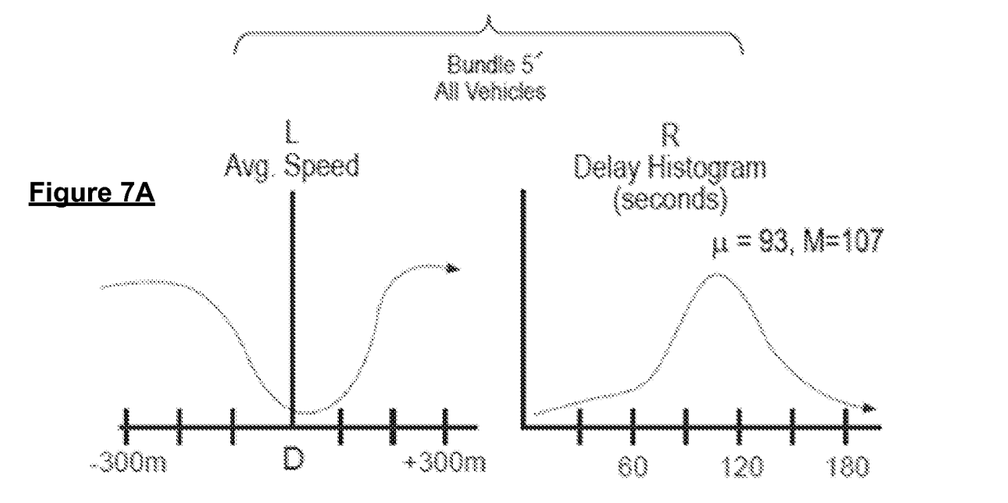
FIGS. 7A-7D illustrate the average speed and delay time of vehicles over two distinct points of the selected bundle of FIG. 6.
Figure 7B:
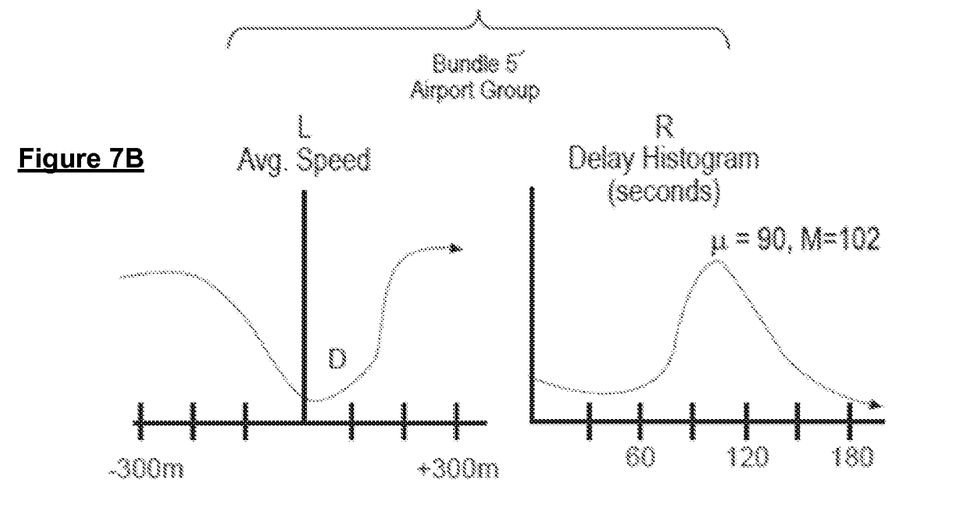

As illustrated in FIGS. 7A-7D, by way of example, it can be readily determined that there is a POI (hotel 22) at the maneuver for trace 9', while there is no POI at the maneuver for trace 5'. The FIGS. 7A-7B show the average speed (column L) and the average time delay (column R) of the bundled trace 5' for the overall random population of vehicles (FIG. 7A) and the airport group (FIG. 7B). In comparing the two vehicle populations, it is apparent that there is little difference in their behavior. Though there is some difference, it is slight, and could be attributed to such things as statistical sampling, differences in vehicle types and behavioral differences due to things that have nothing to do with a POI, such as taxi cabs driving at different speeds or public transportation restricted to certain lanes, for example.

Figure 7C:
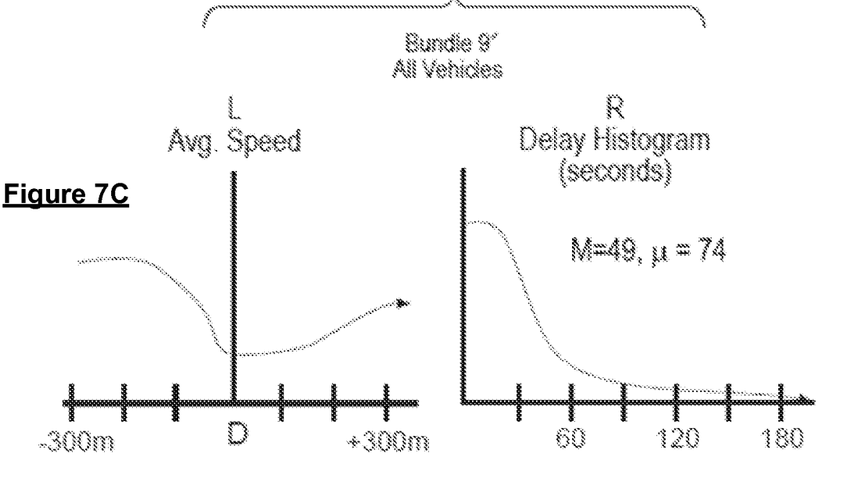
Figure 7D:
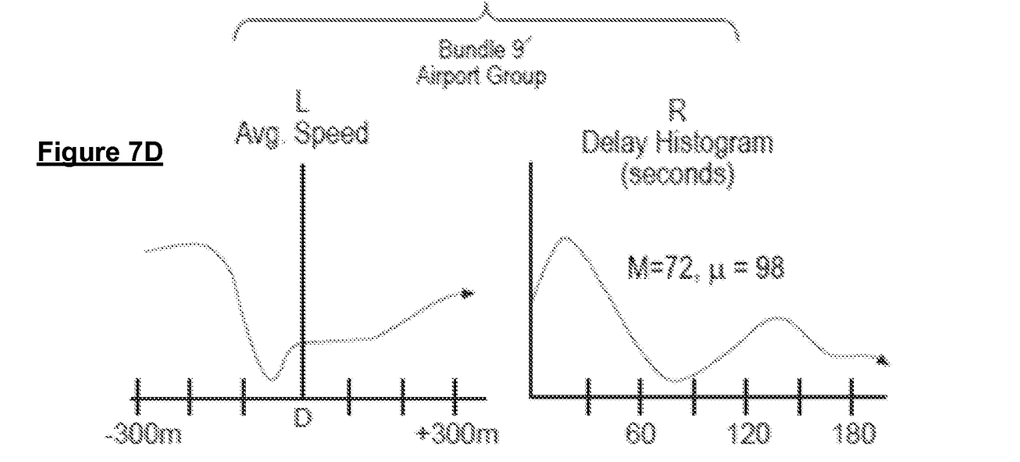

In contrast, the bundled trace 9', as shown in FIGS. 7C-7D wherein the average speed (column L) and the average time delay (column R) for the overall random population of vehicles (FIG. 7C) and the airport group (FIG. 7D) are shown, it is apparent that there is a substantial difference between the behavior of the separate populations which can be inferred by statistical methods. As can be clearly seen from the dramatic drop in the speed profile of the selected airport group, there is a detected POI approximately 65 meters prior to a divergence point 24 where trace 9' diverges from trace 8'. This discernible drop in speed, however, does not appear for the overall random population shown in FIG. 7C. Accordingly, these illustrations show the value of comparing vehicles within the specific target group versus the larger random population.

Of course, depending on the nature of the POI, the number of vehicles in the group stopping at the POI could vary. As such, in accordance with the invention, additional statistical analysis can be performed on the participants to increase the sensitivity in detecting POI. For example, in another embodiment, skew analysis (third moment) and kurtosis (further moment) of the delay profile can be used to determine that a POI is occurring for some vehicles along the route. In looking at the skew analysis, we look for an increased forward component than that of the overall random population of vehicles within the bundle. The forward moment indicates that a small subset of participants in the route is stopping longer than is typical. Similarly, there is a likely POI if the kurtosis is flatter (platykuric, having a wide and generally flat peak around the mean), thereby not having sudden peaks, for the vehicles leaving airport (control group) than for the overall random population of vehicles. The likelihood of a POI, thus, can be calculated by multiplying the likelihood values derived from a single statistical model using mean and standard deviation, as well as the additional values obtained from analyzing the skew and kurtosis.

In accordance with another aspect of the invention, to further pin point POIs, the statistical analysis can be performed at different times to detect patterns of behavior that occur during different times. For example, the probe data can be obtained during different times of the day, different times of the week, different times of the month, or during different times of the year. In the case of the airport example, the vehicle traffic is typically greater during times later in the day, and thus, may not correspond with rush hour traffic which exhibits a different profile. In these cases, the time of day characteristics of the selected control group should be extended to the general population to be compared. This can be done by comparing the group behavior against that of the randomized subset of the general population, selected to have the same time of day statistical profile.

Figure 8A:
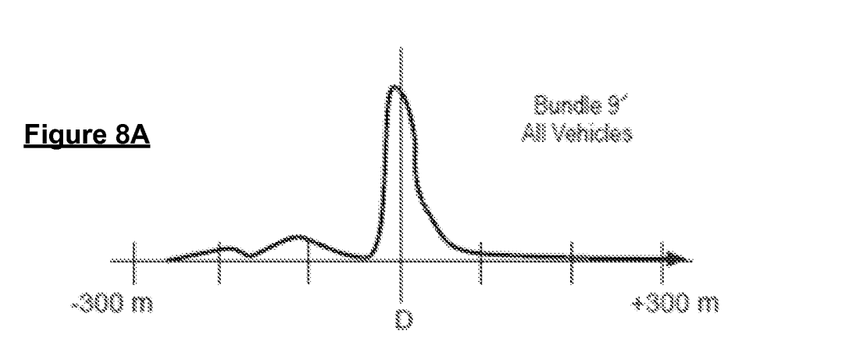
FIGS. 8A-8B illustrate further statistical analysis of data taken at one of the distinct points of FIGS. 7A-7D.
Figure 8B:
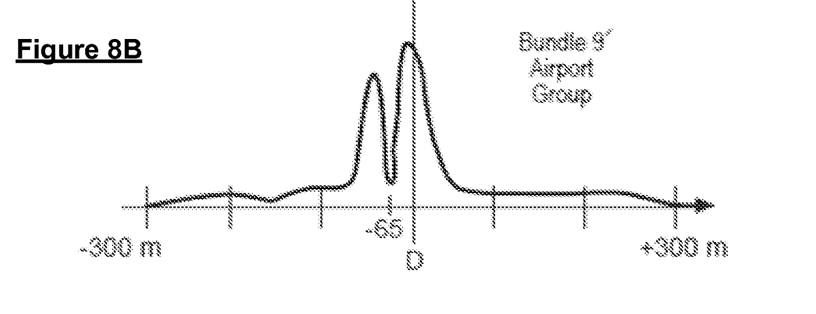

In accordance with another aspect, different analysis techniques can be used to interpret the data. For example, a profile of specific stops at a location that exceed a duration threshold of a predetermined period of time, such as 2 minutes, can be generated. As shown in FIG. 8B, delays in time distinct from the intersection 24, thereby further evidencing and corroborating information that there is POI, and in addition, identifying the location(s) of the POI within the route. For example, as with the evidence in FIG. 7D, column L indicating a slowdown at 65 meters prior to the intersection 24, the delay profile detected via probe data indicates a spike 65 meters prior to the intersection 24. Accordingly, the location of the original maneuver and intersection can now be used to position an entrance (E) to the POI within the street network 18.

The entrance E to the POI can be added automatically to the database, or it can be added manually upon verification, such as via aerial photography, satellite imagery, business and social networking websites, or city plans and maps, for example. Manual editing may be used in naming and deriving type or other information for the POI. In naming and deriving the type or other information for the POI, heuristics based on travel time and behavior, for example, can imply a POI type. Once the POI location has identified, a subset of traces within the selected group is selected which exhibit uncharacteristic delays compared to the overall control population for the particular maneuver. These uncharacteristic delays are then analyzed for time of day, time of week, etc. Any number of heuristic rules based on the culture and customs of the area can be applied. For example, certain areas may exhibit different socially accepted times for various meals (e.g. delay may indicate restaurant), for worship (e.g. delay may indicate a place of worship), for hotel check-in, etc. Other heuristics could indicate a window of time during which a POI is operational, wherein the arrival times may be analyzed and compared for week days versus weekends, thus indicating different times of operation, such as M-F 8:00 am to 7:00 pm, Saturday 8:00 am to 5:00 pm, and closed Sunday, for example. In addition, heuristics can be used to compare similar types of POI, such as hotels, for example, to indicate certain hotels as being preferred over other hotels based on frequency of occurrences.

Figure 9:
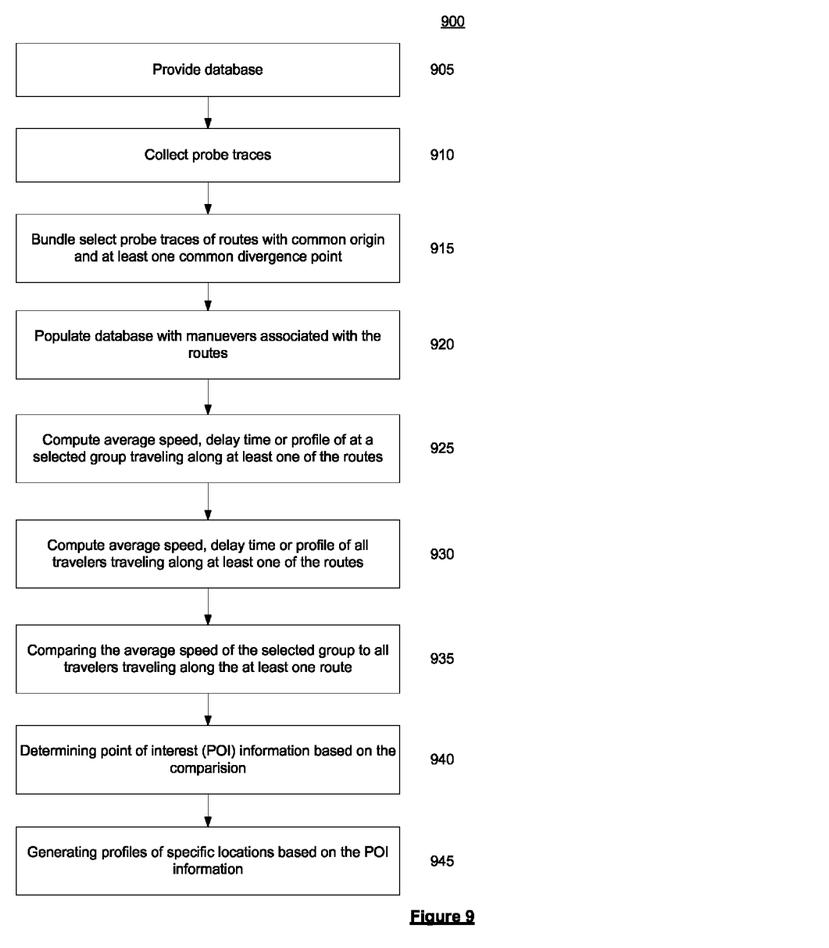
FIG. 9 is a flow chart of a method of analyzing points of interest using traces from probe data.

FIG. 9 is a flow chart setting forth the general stages involved in a method 900 of analyzing points of interest using traces from probe data. Stage 905 provides a database of a digital vector map of a transportation network configured to store a plurality of traces representing roads and collecting probe data from vehicles traveling along the traces. Stage 910 collects a plurality of probe traces from one or more mobile devices traversing the transportation network. Stage 915 bundles a group of select traces having routes with a common origin and at least one divergence point downstream from the origin. Stage 920 populates the database with device maneuvers associated with the bundled routes. Stage 925 computes average speeds and delay times of a selected group of device maneuvers associated with one or more designated locations, i.e., a common location associated with one or more bundled traces. Stage 930 computes average speeds and delay times of all device maneuvers associated with the same one or more designated locations. Stage 935 compares the computed results all device maneuvers with the computed results from the selected group of device maneuvers. Stage 940 determines through statistical probable differences in vehicle behavior between the computations and comparison of device maneuvers (925, 930 and 935) whether a POI location can be inferred at the one or more designated locations. At Stage 945, where a POI location can be inferred for the one or more designated locations, generating a profile for the inferred POI, for example, a POI type and a window of time during which a POI is operational.

Each of the aforementioned pieces of information obtained can be automatically attributed to the entrance point of the POI, or they can be slated for manual entering upon further investigation. In the case of frequency of POI visits, the information can be used to prioritize the manual research for verification purposes. Accordingly, a POI database of most frequently visited sites can be corroborated first.

It should be recognized that the airport example discussed above can be applied to virtually any scenario, particularly those locations having a well defined exit route, wherein vehicles leaving the location can be differentiated from a general population.

Obviously, many modifications and variations of the present invention are possible in light of the above teachings. It is, therefore, to be understood that within the scope of the appended claims, the invention may be practiced otherwise than as specifically described.

What is claimed is:

1. A computer-implemented method of analyzing points of interest using traces from probe data, comprising:
   providing a database of a digital vector map configured to store a plurality of traces representing roads of a navigable street network;
   collecting, by a processor, probe data from mobile device traveling along said traces;
   bundling, by the processor, a group of select traces having routes with a common origin and at least one divergence point downstream from said origin;
   building, by the processor, a database of mobile device maneuvers over said routes;
   computing, by the processor, at least one of average speeds, delay time, or delay profile, of said group of select traces of mobile devices traversing said mobile device maneuvers;
   computing, by the processor, at least one of average speeds, delay time, or delay profile, of all mobile devices traversing said mobile device maneuvers;
   comparing, by the processor, the at least one of average speeds, delay time, or delay profile from the group of select traces of mobile devices with the at least one of average speeds, delay time, or delay profile from all mobile devices traversing said mobile device maneuvers;
   determining, by the processor, from said comparison, information associated with one or more points of interest along said routes; and
   providing, by the processor, the information to one or more mobile devices.

2. The method of claim 1 in which said determining information associated with one or more points of interest along said routes comprises: determining at least one of the location, type of establishment, or hours of operation, of a point of interest along said routes.

3. The method of claim 1 further comprising calculating the skew of the delay times.

4. The method of claim 1 further comprising calculating the kurtosis of the delay times.

5. The method of claim 1 further comprising performing the computing steps during at least one of a predetermined time of day, week, month and year.

6. The method of claim 1 further comprising generating a profile of specific locations along the routes of the delay times.

7. The method of claim 1 further comprising updating or populating the database with the information associated with one or more points of interest.

8. A non-transitory computer-readable medium which stores a set of instructions which, when executed by one or more processors, causes the one or more processors to perform a method of analyzing points of interest using traces from probe data, the method comprising:
   providing a database of a digital vector map configured to store a plurality of traces representing a navigable network;
   collecting probe data from travelers traveling along said traces;
   bundling a group of select traces having routes with a common origin and at least one divergence point downstream from said origin;
   building a database of maneuvers over said routes;
   computing at least one of average speeds, delay time, or delay profile, of said group of select traces of travelers traversing said maneuvers;

computing at least one of average speeds, delay time, or delay profile, of all travelers traversing said maneuvers;

comparing the at least one of average speeds, delay time, or delay profile from the group of select traces of travelers with the at least one of average speeds, delay time, or delay profile from all travelers traversing said maneuvers;

determining from said comparison, information associated with one or more points of interest along said routes; and providing the information to one or more mobile devices.

9. The computer-readable medium of claim 8 in which said determining information associated with one or more points of interest along said routes comprises: determining at least one of the location, type of establishment, or hours of operation, of a point of interest along said routes.

10. The computer-readable medium of claim 8 further comprising calculating the skew of the delay times.

11. The computer-readable medium of claim 8 further comprising calculating the kurtosis of the delay times.

12. The computer-readable medium of claim 8 further comprising performing the computing steps during at least one of a predetermined time of day, week, month and year.

13. The computer-readable medium of claim 8 further comprising generating a profile of specific locations along the routes of the delay times.

14. The computer-readable medium of claim 8 further comprising updating or populating the database with the information associated with one or more points of interest.

15. A system for analyzing points of interest using traces from probe data, comprising:

a memory storage for maintaining a database; and a processing unit coupled to the memory storage, wherein the processing unit is operative to:

collect probe data received from one or more mobile device, the probe data comprising information associated with travel along a transportation network;

bundle a group of select traces, from the probe data, having routes with a common origin and at least one divergence point downstream from said origin;

populate the database with mobile device maneuvers over said routes;

compute at least one of average speeds, delay time, or delay profile, for said group of select traces of mobile devices traversing said mobile device maneuvers;

compute at least one of average speeds, delay time, or delay profile, for all mobile devices traversing said mobile device maneuvers;

compare the at least one of average speeds, delay time, or delay profile from the group of select traces of mobile devices with the at least one of average speeds, delay time, or delay profile from all mobile devices traversing said mobile device maneuvers;

determine, from said comparison, information associated with one or more points of interest along said routes; and provide the information to one or more mobile devices.

16. The system of claim 15, wherein each trace comprises a sequence of maneuvers.

17. The system of claim 15, wherein the determination comprises: determining at least one of the location, type of establishment, or hours of operation, of a point of interest along said routes.

18. The system of claim 15, wherein the processor is further arranged to perform the computation steps during at least one of a predetermined time of day, week, month and year.

19. The system of claim 15, wherein the processor is further arranged to infer a behavior of the select group based on the comparison of the select group of mobile devices and all mobile devices.

20. The system of claim 15, wherein the processor is further arranged to apply one or more heuristic rules to the select traces of mobile devices.

* * * * *